US011989907B2

(12) United States Patent
Takashima et al.

(10) Patent No.: US 11,989,907 B2
(45) Date of Patent: May 21, 2024

(54) CLOUD OBSERVATION DEVICE, CLOUD OBSERVATION METHOD, AND PROGRAM

(71) Applicant: Furuno Electric Co., Ltd., Nishinomiya (JP)

(72) Inventors: Yuya Takashima, Nishinomiya (JP); Masahiro Minowa, Nishinomiya (JP); Shigeaki Okumura, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 386 days.

(21) Appl. No.: 17/466,284

(22) Filed: Sep. 3, 2021

(65) Prior Publication Data

US 2021/0398312 A1    Dec. 23, 2021

Related U.S. Application Data

(63) Continuation of application No. PCT/JP2020/004220, filed on Feb. 5, 2020.

(30) Foreign Application Priority Data

Mar. 6, 2019    (JP) .................................. 2019-040866

(51) Int. Cl.
 *G01W 1/12* (2006.01)
 *G01W 1/02* (2006.01)
 (Continued)

(52) U.S. Cl.
 CPC ................. *G06T 7/70* (2017.01); *G01W 1/02* (2013.01); *G01W 1/12* (2013.01); *G06T 3/4053* (2013.01);
 (Continued)

(58) Field of Classification Search
 CPC .......... G06T 7/70; G06T 3/4053; G06T 5/50; G06T 2207/10016; G06T 2207/20076;
 (Continued)

(56) References Cited

U.S. PATENT DOCUMENTS 9,069,103 B2 *   6/2015   Williams ................ G01W 1/00
2006/0207730 A1   9/2006   Berman et al.
(Continued)

FOREIGN PATENT DOCUMENTS

CN    101246545 A    8/2008
CN    101344391 A    1/2009
(Continued)

OTHER PUBLICATIONS

European Patent Office, Partial Supplementary European Search Report issued in Application No. 20767339.3, Oct. 21, 2022, Germany, 14 pages.
(Continued)

*Primary Examiner* — Aaron W Carter
(74) *Attorney, Agent, or Firm* — Alleman Hall & Tuttle LLP

(57) ABSTRACT

To provide a cloud observation device capable of reducing calculation cost and predicting sunshine probability by a simple method. A cloud observation device includes an image acquisition module which acquires an image in which a camera photographs the sky, a cloud extraction module which extracts clouds in the image, a sun position determination module which determines a sun position in the image, a sunshine probability calculation area setting module which sets a sunshine probability calculation area having the sun position as a base point in the image, and a sunshine probability calculation module which calculates a sunshine probability after a predetermined time has elapsed based on the sunshine probability calculation area and the extracted clouds.

18 Claims, 16 Drawing Sheets

(51) Int. Cl.
*G06T 3/4053* (2024.01)
*G06T 5/50* (2006.01)
*G06T 7/70* (2017.01)

(52) U.S. Cl.
CPC ...... *G06T 5/50* (2013.01); *G06T 2207/10016* (2013.01); *G06T 2207/20076* (2013.01); *G06T 2207/30192* (2013.01)

(58) Field of Classification Search
CPC ......... G06T 2207/30192; G01W 1/02; G01W 1/12; G01W 2203/00; G01W 1/10; Y02A 90/10; G06V 10/60; G06V 2201/10; G06V 10/70; G06V 20/10
See application file for complete search history.

(56) References Cited

U.S. PATENT DOCUMENTS

| | | | |
|---|---|---|---|
| 2010/0309330 | A1 | 12/2010 | Beck |
| 2013/0239952 | A1 | 9/2013 | Kroyzer et al. |
| 2013/0258068 | A1* | 10/2013 | Schmidt ................. F24S 50/00 348/143 |
| 2014/0083413 | A1* | 3/2014 | Bibi ........................ F24S 50/00 702/3 |
| 2014/0191581 | A1* | 7/2014 | Inuzuka ................... H02J 3/381 307/80 |
| 2015/0301226 | A1* | 10/2015 | Sun ........................ G01J 1/4204 702/3 |
| 2015/0302575 | A1* | 10/2015 | Sun ........................... G06T 7/70 382/103 |
| 2016/0127642 | A1* | 5/2016 | Schechner ............ G01J 3/0289 348/38 |
| 2016/0156183 | A1* | 6/2016 | Sano ........................ H02J 7/35 307/66 |
| 2016/0363696 | A1* | 12/2016 | Dao ....................... G06V 20/13 |
| 2017/0031056 | A1* | 2/2017 | Vega-Avila ........ G06Q 10/0635 |
| 2017/0293049 | A1 | 10/2017 | Frank et al. |
| 2017/0351970 | A1* | 12/2017 | Abedini ................. G06N 20/00 |
| 2018/0047170 | A1* | 2/2018 | Hamann ................ H04N 25/71 |
| 2018/0232557 | A1* | 8/2018 | Chang ................... G06T 7/215 |
| 2019/0158011 | A1* | 5/2019 | West ....................... G06N 20/20 |
| 2020/0240206 | A1* | 7/2020 | Hebeisen ................. E06B 9/68 |
| 2021/0110565 | A1* | 4/2021 | Takashima ................ G06T 3/40 |
| 2021/0135623 | A1* | 5/2021 | Roy ........................ G01W 1/12 |
| 2021/0165130 | A1* | 6/2021 | Chang ...................... G06T 7/20 |
| 2021/0360214 | A1* | 11/2021 | Arakawa ................ H04N 23/88 |
| 2021/0398312 | A1* | 12/2021 | Takashima ............. G01W 1/02 |
| 2022/0084242 | A1* | 3/2022 | Takashima ............ G06V 10/24 |
| 2023/0177803 | A1* | 6/2023 | Takashima ............ G06V 10/60 382/103 |
| 2023/0186594 | A1* | 6/2023 | Kakimoto ............. G06V 10/26 382/103 |

FOREIGN PATENT DOCUMENTS

| | | |
|---|---|---|
| CN | 103019261 A | 4/2013 |
| CN | 103513295 A | 1/2014 |
| CN | 103986534 A | 8/2014 |
| CN | 105791016 A | 7/2016 |
| CN | 206684326 U | 11/2017 |
| EP | 2645135 A1 | 10/2013 |
| FR | 3047830 A1 | 8/2017 |
| JP | S60220843 A | 11/1985 |
| JP | H08335030 A | 12/1996 |
| JP | H1130626 A | 2/1999 |
| JP | H1172370 A | 3/1999 |
| JP | 2011214423 A | 10/2011 |
| JP | 2013222423 A | 10/2013 |
| JP | 2014011345 A | 1/2014 |
| WO | 2014109020 A1 | 7/2014 |
| WO | 2015104281 A1 | 7/2015 |

OTHER PUBLICATIONS

China National Intellectual Property Administration, Office Action and Search Report Issued in Application No. 202080018880.9, Dec. 7, 2023, 12 pages.

Urquhart, B., "Development of a short-term solar power forecasting capability using ground-based visible wavelength imagery," Mechanical Engineering Dissertation, University of California, San Diego, 2014, 243 pages.

Tamba, S. et al., "Spatial and temporal behaviors of sea skin temperature observed by thermal infrared camera," Proceedings of IEEE International Geoscience and Remote Sensing Symposium, Aug. 3, 1997, Singapore, 3 pages.

* cited by examiner

CLOUD OBSERVATION DEVICE, CLOUD OBSERVATION METHOD, AND PROGRAM

CROSS-REFERENCE TO RELATED APPLICATION(S)

This application is a continuation of PCT International Application No. PCT/JP2020/004220, which was filed on Feb. 5, 2020, and which claims priority to Japanese patent Application No. 2019-040866 filed on Mar. 6, 2019, the entire disclosures of each of which are herein incorporated by reference for all purposes.

TECHNICAL FIELD

The present disclosure relates to a cloud observation device, a cloud observation method, and a program.

BACKGROUND

For conventional cloud observation, satellites are mainly used. Since satellites observe clouds from above, they cannot obtain detailed distribution of clouds near the ground. Therefore, an amount and a duration of sunlight on the ground cannot be grasped by the satellite.

As an alternative to satellites, it is known to use a whole-sky camera installed on the ground. For example, Patent Document 1 describes that images obtained by sequentially photographing the sky with a camera are acquired, a sun region and a cloud region are determined for each image, a moving direction and a moving speed of clouds are calculated based on each image, a position of the clouds after a predetermined time in the image is predicted, and a rate at which the sun is hidden by the clouds is calculated.

Patent Document 1

Publication of Japanese Utility Patent Application Publication No. 2014-011345

However, the method described in Patent Document 1 cannot be said to be low in calculation cost because it is necessary to calculate the movement locus of the cloud of interest until the lapse of a predetermined time, and to perform predictive calculation of the movement locus of all clouds on the image. Further, since the moving locus is calculated for each cloud, the prediction calculation method may become complicated in order to calculate a probability of sunshine at a plurality of time instances.

The object of the present disclosure is to provide a cloud observation device, a cloud observation method, and a program capable of reducing the calculation cost and predicting the probability of sunshine by a simple method.

SUMMARY

A cloud observation device of the present disclosure includes:
- an image acquisition module configured to acquire an image of the sky captured by a camera;
- a cloud extraction module configured to extract clouds in the image;
- a sun position determination module configured to determine a sun position in the image;
- a sunshine probability calculation area setting module configured to set a sunshine probability calculation area having the sun position as a base point in the image; and
- a sunshine probability calculation module configured to calculate a sunshine probability after a predetermined period of time has elapsed based on the sunshine probability calculation area and the extracted clouds.

A cloud observation device, comprising:
processing circuitry configured
- to acquire an image of the sky captured by a camera;
- to extract clouds in the image;
- to determine a sun position in the image;
- to set a sunshine probability calculation area having the sun position as a base point in the image; and
- to calculate a sunshine probability after a predetermined period of time has elapsed based on the sunshine probability calculation area and the extracted clouds As described above, since the sunshine probability is calculated after the predetermined period of time has elapsed based on the sunshine probability calculation area and the extracted clouds with the sun position set as the base point, it is not necessary to predict the position for each cloud after the predetermined time has elapsed, and it is only necessary to determine whether or not the cloud exists in the sunshine probability calculation area. However, the sunshine probability at a plurality of time instances can be easily calculated only by changing the area to be evaluated in the sunshine probability calculation area. Therefore, the sunshine probability can be calculated by reducing the calculation cost and by using a simple method.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

DETAILED DESCRIPTION

Hereinafter, a first embodiment of the present disclosure will be described with reference to the drawings.

Figure 1:
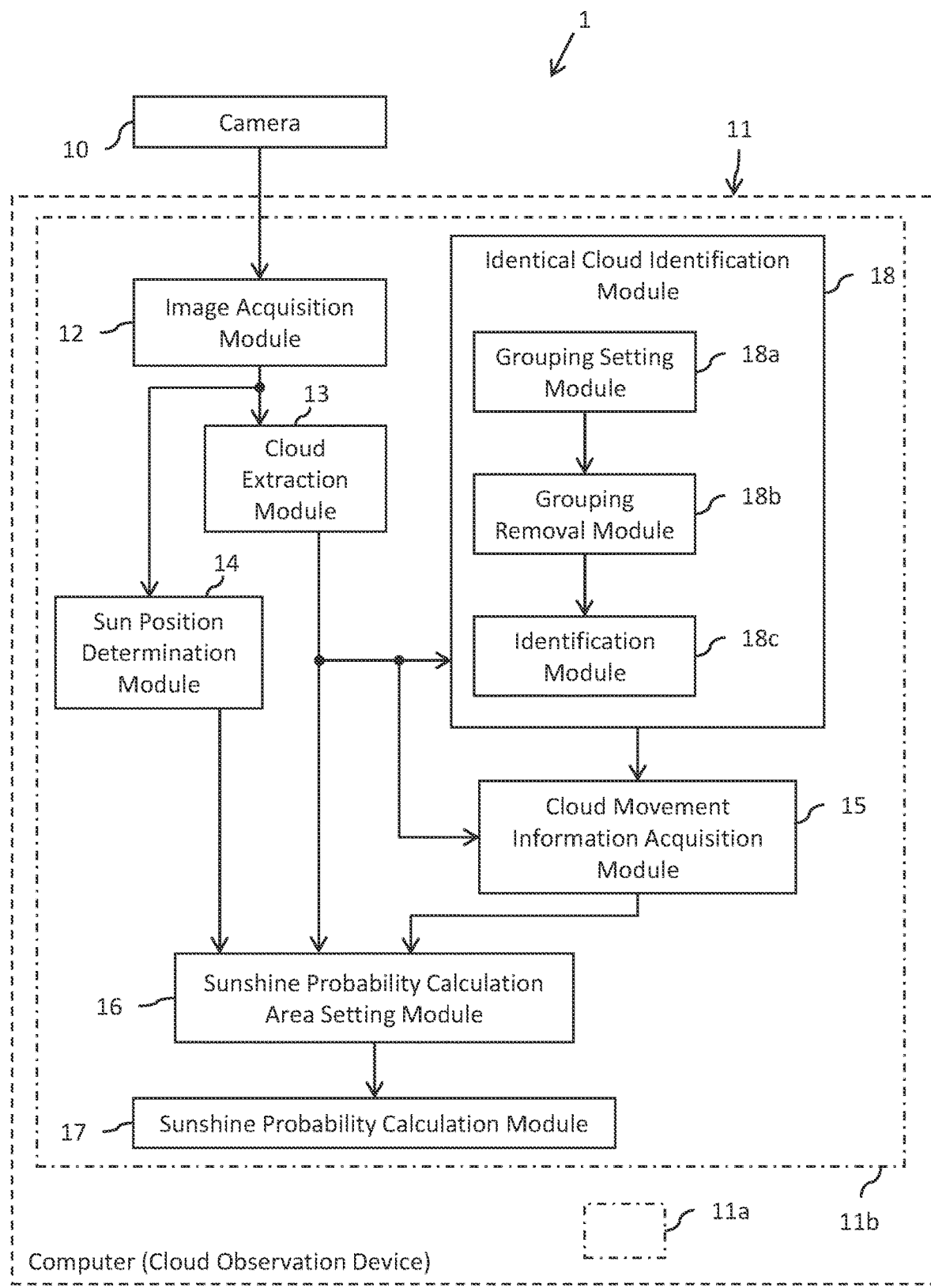
FIG. 1 is a block diagram showing a configuration of a cloud observation system according to a first embodiment of the present disclosure.

As shown in FIG. 1, the cloud observation system 1 of this embodiment includes a camera 10 configured to photograph the sky and a computer (cloud observation device) 11 configured to process an image of the sky photographed by the camera 10. The camera 10 may be any camera that can photograph the sky. In this embodiment, a whole-sky camera using a fisheye lens is installed facing upward in a vertical direction in order to photograph a wide area of the sky with one camera. Therefore, a center of the image obtained from the camera 10 becomes straight up (Elevation angle 90°), and the elevation angle decreases from the center towards an end of the image.

The cloud observation device 11 implemented by the computer (cloud observation device) 11 of this embodiment processes the image of the sky taken by the camera 10. Specifically, as shown in FIG. 1, the cloud observation device 11 includes an image acquisition module 12, a cloud extraction module 13, a sun position determination module 14, a cloud movement information acquisition module 15, a sunshine probability calculation area setting module 16, and a sunshine probability calculation module 17. The respective modules 12-17 are implemented in cooperation of software and hardware by executing programs previously stored in a memory 11a by a processor 11b (processing circuitry) in the computer (cloud observation device) 11 provided with the processor 11b such as a CPU, the memory 11a, various interfaces, etc.

Figure 3:
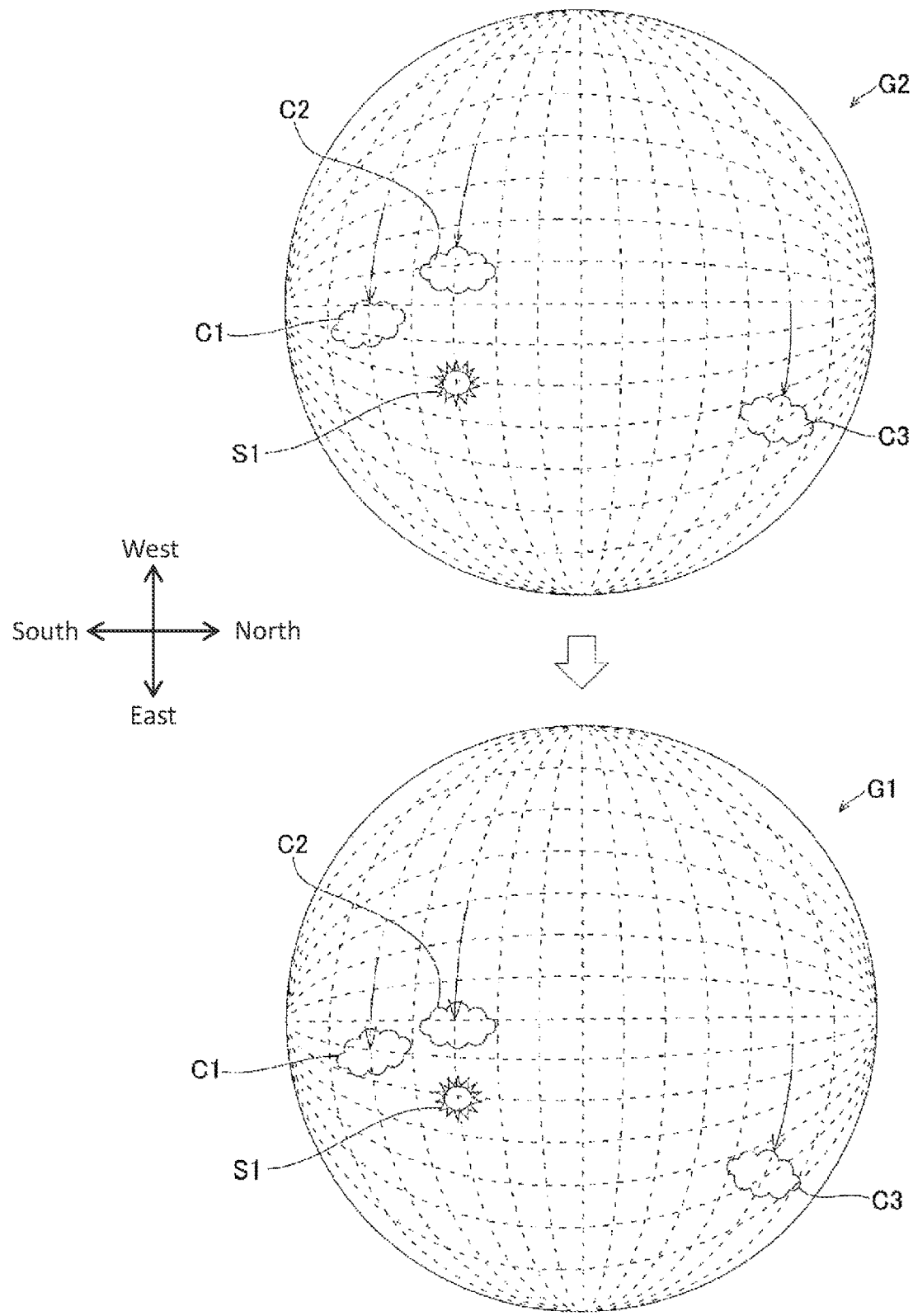
FIG. 3 shows an image of the sky taken by a camera.

As shown in FIG. 3, the image acquisition module 12 shown in FIG. 1 acquires images G1 and G2 in which the camera captures the sky. In the example of FIG. 3, the second image G2 is an image photographed one minute before the first image G1. The center of the image is directly above, and clouds (C1, C2, C3) and the sun (S1) are shown. In this embodiment, the image acquisition module 12 acquires a plurality of images obtained by sequentially photographing the sky by the camera 10. In the present embodiment, the timing of photographing is every minute, but the timing is not limited to this and may be a predetermined timing. The predetermined timing can be changed in various ways, for example, every few seconds, every few minutes, every time a random length of time has elapsed, or at one or more predetermined time instances. The image shown in FIG. 3 contains RGB components and shows a blue sky, clouds (C1, C2, C3) and the sun (S1).

The cloud extraction module 13 shown in FIG. 1 extracts clouds in the image. The cloud extraction module 13 identifies and extracts pixels that are clouds from a plurality of pixels constituting the image. An algorithm for determining clouds and skies in this embodiment will be described herein. A luminance value 255 is white and a luminance value 0 is black. As a result of the research, the inventors found that a luminance value of the blue component and a luminance value of the red component of the cloud both have a value of 0-255, a luminance value of the blue component of the sky has a value of 0-255, and a luminance value of the red component of the sky has a value of 0 or nearly 0. That is, when the difference between the luminance of the blue component and the luminance of the red component is large, it is determined to be sky, and when the difference between the two is small, it is determined to be cloud. In this embodiment, it is determined whether a plurality of pixels constituting an image are clouds based on the luminance of the pixels. Specifically, when the difference value obtained by subtracting the luminance of the red component from the luminance of the blue component is less than a predetermined threshold value, it is determined that the pixel is a cloud, and when the difference value is not less than the predetermined threshold value, it is determined that the pixel is not a cloud. Of course, the method of identifying clouds is not limited to this, and various methods may be employed.

The sun position determination module 14 shown in FIG. 1 determines a sun position in the image. A first embodiment for determining the sun utilizes the fact that a position of a pixel reflected in an image can be determined based on the position of a camera (latitude and longitude) and the date and time when the image is taken by utilizing astronomy. That is, the sun position determination module 14 determines a pixel that is the sun based on the camera position and the date and time of imaging. In a second embodiment for determining the sun, the sun position determination module 14 determines that the sun is a region radiating from the center point of the pixel group having the maximum luminance in the image, wherein the luminance decreases gradually without pulsation as the distance from the center point increases and the luminance pulsation starts. Of course, the method of determining the sun is not limited to this, and various methods may be employed.

The cloud movement information acquisition module 15 shown in FIG. 1 acquires cloud movement information in the image. The cloud movement information acquired by the cloud movement information acquisition module 15 of the present embodiment includes, but is not limited to, a cloud movement direction and a cloud movement speed. For example, if at least the cloud movement direction is included in the cloud movement information, the cloud movement speed can be omitted.

In the embodiment shown in FIG. 1, the cloud movement information acquisition module 15 calculates cloud movement information in each image based on a plurality of sequentially photographed images. In this way, the cloud movement information (direction and speed of movement) can be acquired only from the image. Specifically, the cloud movement information acquisition module 15 calculates cloud movement information of each cloud C1 to C3 by comparing the plurality of images G1 and G2. FIG. 3 illustrates the cloud movement direction of each cloud C1, C2, C3 with arrows. The cloud movement speed can be expressed by the length of the arrow. In the example of FIG.

3, since all of the clouds C1, C2, and C3 are moving from west to east, the directions of arrows indicating the moving directions are all the same, but since the images G1 and G2 shown in FIG. 3 are images taken with a fish-eye lens, the moving directions of the clouds C1, C2, and C3 are indicated by the curvature corresponding to the distance from the top (image center). In the example of FIG. 3, the auxiliary lines are shown by dotted lines for reference.

In the embodiment shown in FIG. 1, an identical cloud identification module 18 is provided that is configured to identify clouds corresponding to clouds in the second image G2 photographed before the first image G1 from among clouds (C1, C2, C3) in the first image G1. In the example of FIG. 3, it is identified that the cloud C1 in the first image G1 is the corresponding cloud C1 in the second image G2, the cloud C2 in the first image G1 is the corresponding cloud C2 in the second image G2, and the cloud C3 in the first image G1 is the corresponding cloud C3 in the second image G2. The cloud movement information acquisition module 15 calculates cloud movement information (See arrows in FIG. 3) based on the positions of clouds (C1, C2, C3) in the first image G1 and the corresponding positions of clouds (C1, C2, C3) in the second image G2. As described above, since the corresponding clouds are identified from the first image G1 and the second image G2 and the cloud movement information (direction and speed of movement) is calculated based on the positions of the corresponding clouds, the cloud movement information can be appropriately acquired only by image processing.

A more specific configuration of the identical cloud identification module 18 will be described. As shown in FIG. 1, the identical cloud identification module 18 includes a grouping setting module 18a, a grouping removal module 18b, and an identification module 18c.

Figure 5:
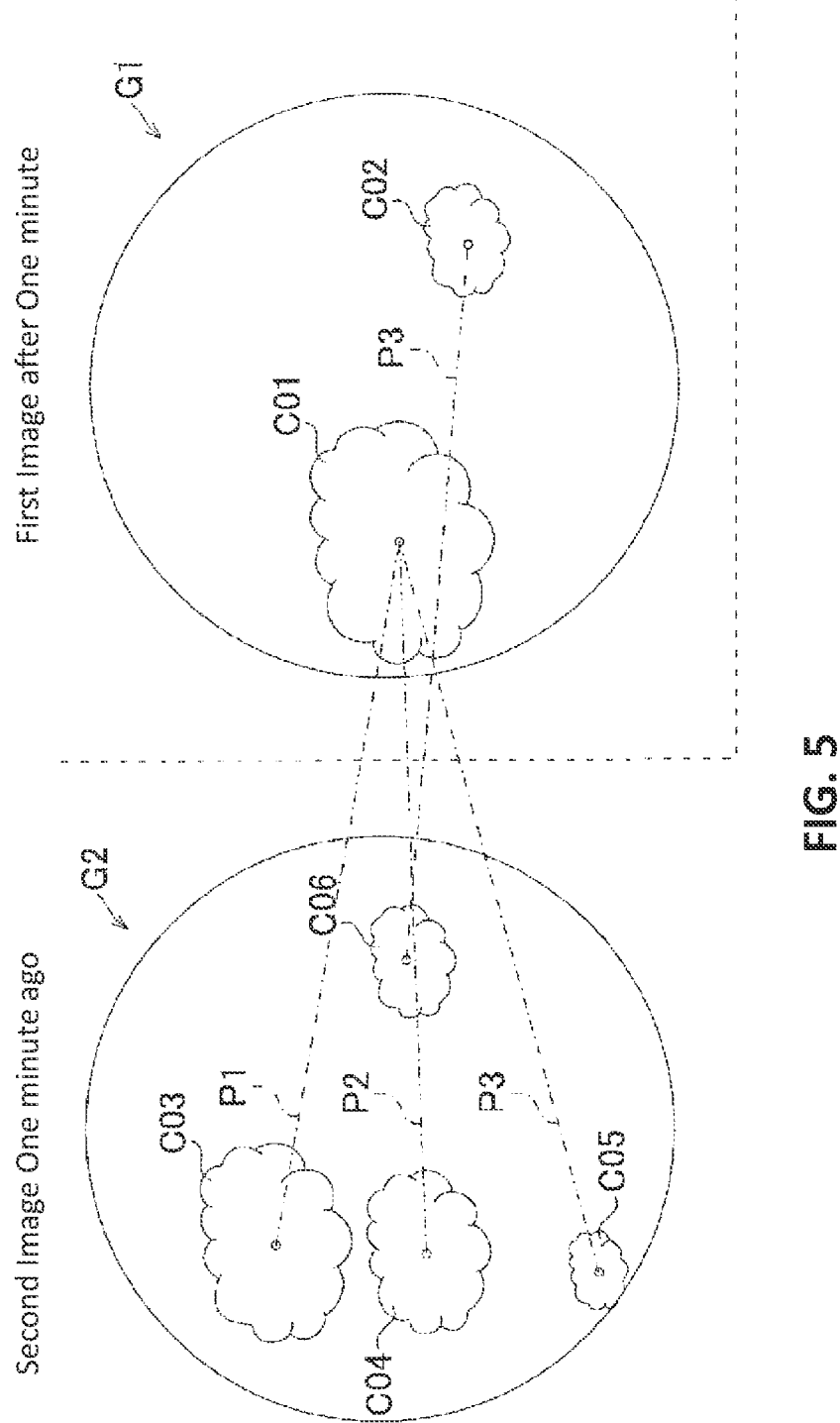
FIG. 5 is an explanatory diagram of an algorithm for recognizing an identical cloud from a first image and a second image according to the first embodiment.
Figure 6:
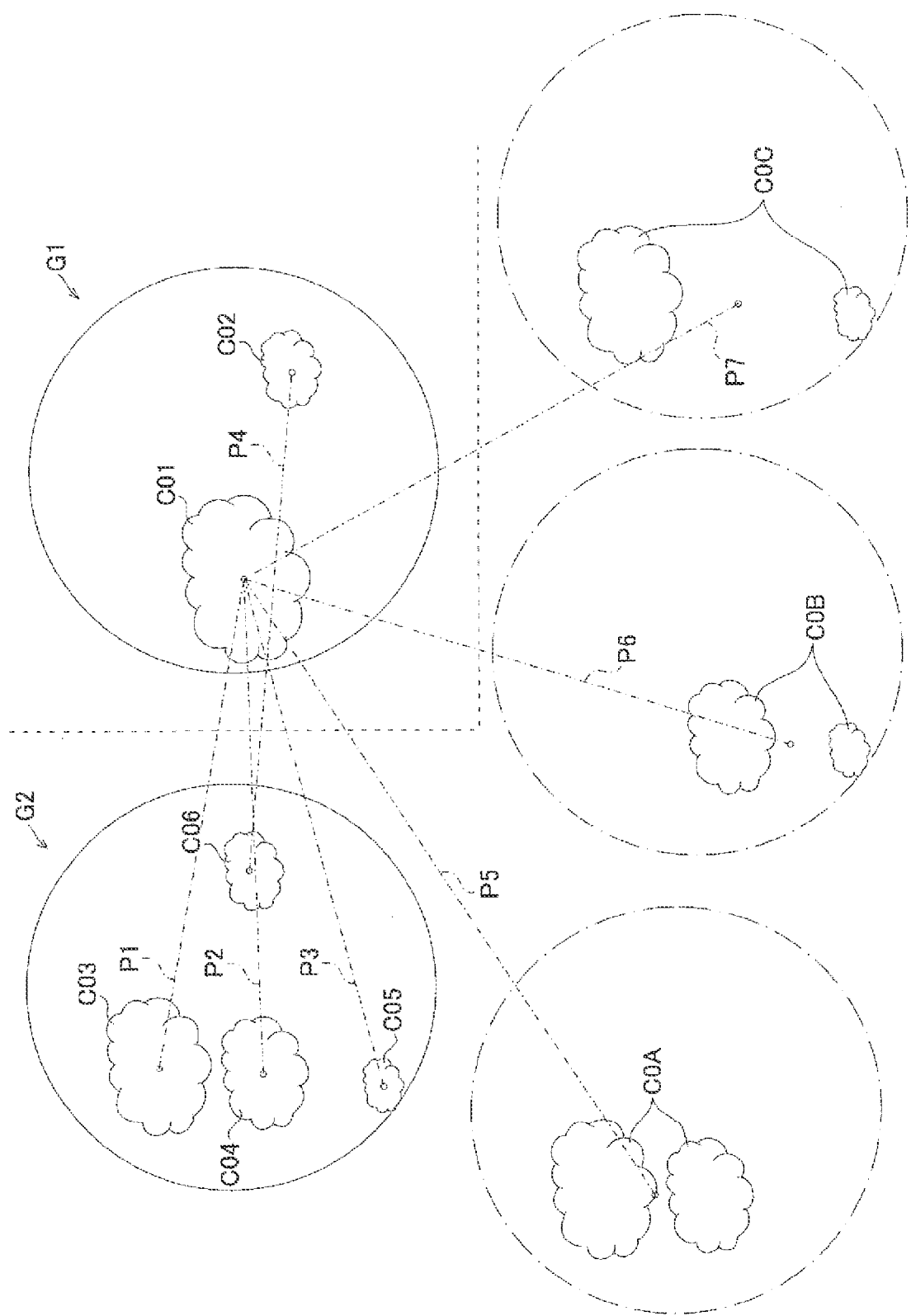
FIG. 6 is an explanatory diagram of an algorithm for recognizing the identical cloud from the first image and the second image according to the first embodiment.

The grouping setting module 18a shown in FIG. 1 sets a plurality of groups in which clouds in the first image G1 and clouds in the second image G2 are combined in a relationship of at least one of one-to-one, one-to-many, or many-to-one. FIG. 5 shows an example in which a plurality of groups (P1 to P4) are formed by combining clouds (C01, C02) in the first image G1 and clouds (C03, C04, C05, C06) in the second image G2 in a one-to-one manner. In this figure, the position of the center of gravity of each cloud is indicated by a circle, and it is an example of combining the nearest centers of gravity. The figure shows four groups P1, P2, P3 and P4. FIG. 6 is an explanatory diagram configured to set a plurality of groups in which clouds (C01, C02) in the first image G1 and clouds (C03, C04, C05, C06) in the second image G2 are combined in a many-to-one manner with respect to the plurality of groups (P1 to P4) shown in FIG. 5. First, as shown in FIG. 6, a composite cloud (C0A, C0B, C0C) obtained by combining two clouds in the second image G2 is generated in all patterns, and a plurality of groups (P5, P6, P7) of the composite cloud (C0A, C0B, C0C) and the cloud (C01, C02) in the first image G1 are generated. Here, as in the case of generating the one-to-one set shown in FIG. 5, the nearest barycentric positions are combined.

The grouping removal module 18b shown in FIG. 1 deletes a group from the plurality of groups set based on at least one of a moving distance between clouds, a size change amount, a luminance change, a saturation change, and a hue change so that one group is set for one cloud. The moving distance can be calculated by comparing the barycentric positions of clouds in the first image G1 and the second image G2. The size of the composite cloud can be calculated by the sum of the areas of the clouds to be synthesized. For example, with respect to the group P7 shown in FIG. 6, since the two clouds C03 and C05 constituting the composite cloud C0C are too far away from the center of gravity position of the corresponding cloud C01, it can be mentioned that the two clouds C03 and C05 are to be deleted. Further, regarding the group P3 shown in FIG. 6, since the size change amount of the cloud C05 in the second image G2 and the cloud C01 in the first image G1 is large, it may be considered as a deletion object. As an embodiment, threshold values for the moving distance, the size change amount, the luminance change, the saturation change, and the hue change may be set in advance, and the deletion target may be determined on the condition of the threshold values. The threshold may be determined by a person, predetermined by statistical processing, or machine-learned models determined by teaching data.

Figure 7:
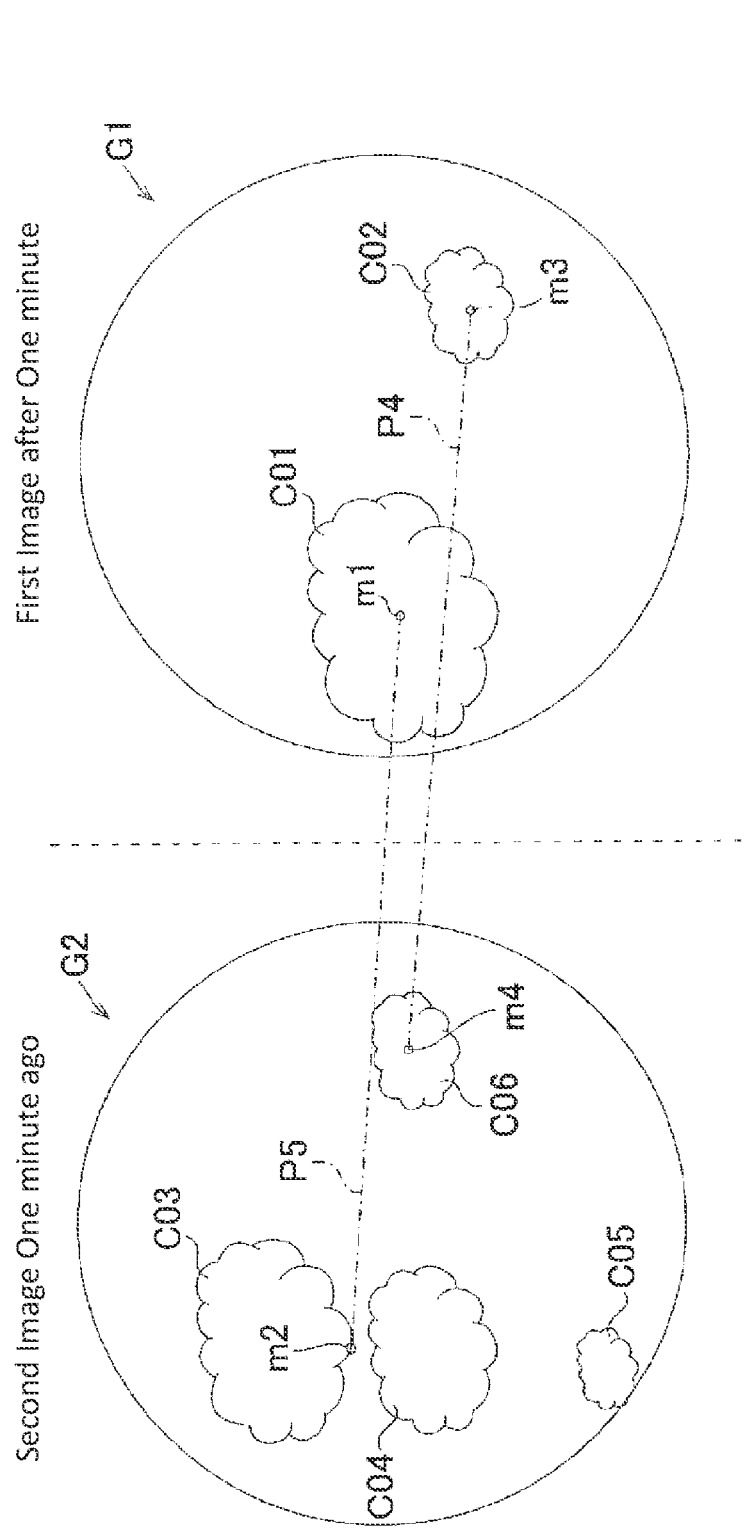
FIG. 7 is an explanatory diagram of an algorithm for recognizing the identical cloud from the first image and the second image according to the first embodiment.

The identification module 18c shown in FIG. 1 identifies that the clouds in the first image G1 and the corresponding clouds in the second image G2 are the identical clouds based on the remaining group. Similarly, to the criterion of the grouping removal module 18b, at least one of the moving distance, the size change amount, the luminance change, the saturation change, and the hue change between clouds is determined based on an index value. In this description, as shown in FIG. 7, it is determined that the clouds C03 and C04 in the second image G2 and the cloud C01 in the first image G1 are identical clouds on the basis of at least one of the moving distance between the clouds, the size change amount, the luminance change, the saturation change, and the hue change. Further, it is determined that the cloud C06 in the second image G2 and the cloud C02 in the first image G1 are identical to each other, assuming that the group P4 satisfies the condition most. Since it is necessary for the identification module 18c to determine one group so that a plurality of groups are not set for one cloud, the group having the highest evaluation value may be selected by comprehensively considering the index value.

It should be noted that at least one of the grouping removal module 18b and the identification module 18c may be implemented using a discriminator which discriminates whether a cloud is to be deleted or selected by using machine learning (For example, deep neural networks (DNN)) which outputs an output value indicating whether at least one of the moving distance between clouds, the size change amount, the luminance change, the saturation change, and the hue change is an input value. In addition, a group may be selected so that one group is set for one cloud based on at least one of the moving distance between clouds, the size change amount, the luminance change, the saturation change, and the hue change among the plurality of groups set by the grouping setting module 18a without providing the grouping removal module 18b and the identification module 18c.

The cloud movement information acquisition module 15 shown in FIG. 1 calculates the cloud movement information based on the cloud position in the first image G1 and the corresponding cloud position in the second image G2, as shown in FIG. 7. In the example of FIG. 7, the cloud movement information can be calculated by comparing a center of gravity position m1 of the cloud C01 in the first image G1 with a center of gravity position m2 of the corresponding clouds C03, C04 in the second image G2. Similarly, the cloud movement information can be calculated by comparing a centroid position m3 of the cloud C02 in the first image G1 with a corresponding centroid position m4 of the cloud C06 in the second image G2. It is preferable that the cloud movement information acquisition module 15 stores the positions of clouds in each image as time-series data, and calculates the cloud movement direction in the cloud movement information by averaging the cloud movement directions in each image. It is preferable to calculate the cloud movement speed in the cloud movement information by averaging the cloud movement speed in each image. Various moving averages are available, such as simple moving averages, weighted moving averages, and exponential moving averages.

Figure 8:
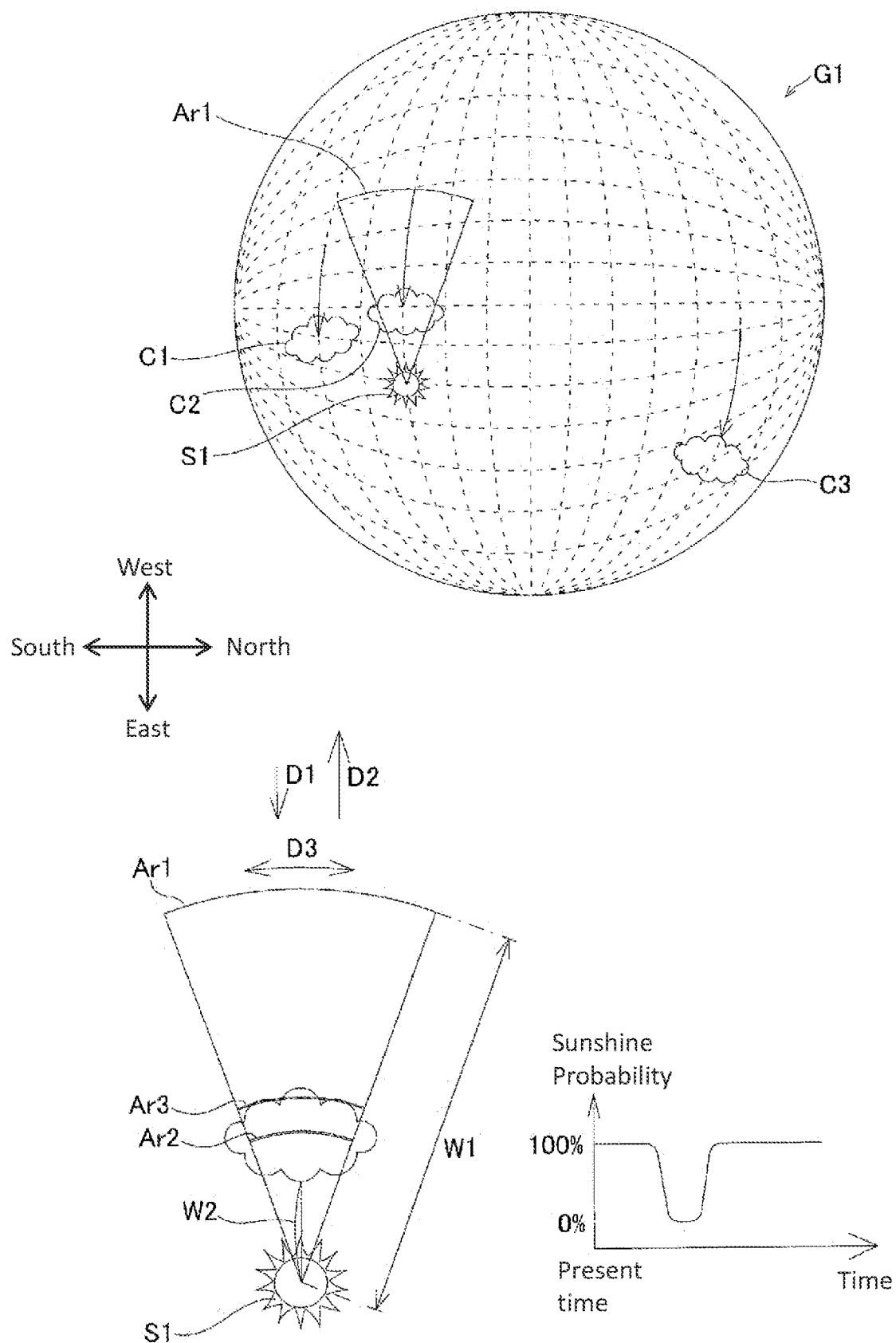
FIG. 8 is an explanatory view of a sunshine probability calculation area superimposed on an image and calculation of a sunshine probability.

As shown in FIG. 8, the sunshine probability calculation area setting module 16 shown in FIG. 1 sets a sunshine probability calculation area Ar1 having the sun position S1 as a base point in the image. As shown in the figure, it is preferable that the sunshine probability calculation area Ar1 is wider on the upstream side (west) of a cloud movement direction D1 than on the downstream side (east) with the sun position S1 as a base point. The base point of the sun position S1 may be the center of a pixel or a region indicating the sun, may be on the circumference, or may be any other point on the basis of the sun position S1. As shown in FIG. 8, the sunshine probability calculation area Ar1 preferably has a region extending from the sun position S1 side toward the upstream side (west) in the cloud movement direction D1. This is because the upstream side (west) of the cloud movement direction D1 with the sun position S1 as a base point is a region where a possibility of the cloud reaching the sun with the passage of time is higher than the downstream side (east), and an accuracy of the prediction of the sunshine probability is improved.

As shown in FIG. 8, the sunshine probability calculation area Ar1 has a width equal to or greater than a predetermined value in a direction D3 orthogonal to a direction D2 away from the sun position S1. It is preferable that the predetermined value has a width of 10 degrees or more around a virtual center line extending from the sun position S1 toward the upstream side D2 of the cloud movement direction D1. This is because there is a possibility that the cloud movement direction D1 changes with the passage of time, and if the sunshine probability calculation area Ar1 has a width equal to or greater than a predetermined value, the possibility that the cloud movement direction D1 changes can be accommodated. In other words, if the width is large, it can cope with a large change in the cloud movement direction D1.

As shown in FIG. 8, a length W1 of the sunshine probability calculation area Ar1 in the direction D2 away from the sun position S1 is preferably set in accordance with the cloud movement speed with the sun position S1 as a starting point. The length W1 can be appropriately set according to the time range and the cloud movement speed from the present to the future in which the sunshine probability is desired to be predicted. For example, in the case of predicting up to 10 minutes later, if the cloud movement speed is high, the length W1 needs to be set long, and if the cloud movement speed is low, the length W1 needs to be set short.

As shown in FIG. 8, the sunshine probability calculation area Ar1 has a shape in which the width increases toward the direction D2 away from the sun position S1. The longer it takes for a cloud to reach the sun position S1, that is, the farther it is from the sun position S1, it is more likely that the moving direction of the cloud changes, so by making the sunshine probability calculation area Ar1 wider towards the direction D2 away from the sun position S1, the area corresponding to the change probability of the path can be set.

The sunshine probability calculation module 17 shown in FIG. 1 calculates a sunshine probability after a predetermined time has elapsed based on the sunshine probability calculation area Ar1 and the extracted clouds. More specifically, as shown in FIG. 8, the sunshine probability calculation module 17 calculates the sunshine probability after the predetermined time has elapsed based on a distance W2 from the extracted clouds to the sun position S1 and the cloud movement speed. In the example of FIG. 8, since the time when the cloud reaches the sun position S1 can be calculated based on the distance W2 and the cloud movement speed, it can be calculated that it will become cloudy after the calculated time elapses. Similarly, the time for the cloud to pass through the sun position S1 can be calculated in the same manner.

Further, as shown in FIG. 8, the sunshine probability calculation module 17 can calculate, for example, the sunshine probability after 1 minute based on the overlapping area of a sunshine probability calculation area Ar2 corresponding to 1 minute later and the extracted clouds. The sunshine probability calculation area Ar2 is a region having a predetermined radius around the sun position S1. If the overlapping area of clouds occupying the sunshine probability calculation area Ar2 is 100%, the probability of solar radiation is 0%. For example, the probability of sunshine after two minutes can be calculated based on the overlapping area of a sunshine probability calculation area Ar3 corresponding to the second minute and the extracted clouds. In the example of the figure, since the overlapping area of clouds occupying the sunshine probability calculation area Ar3 is not 100% but, for example, 80%, it can be determined that the sunlight probability is 20%. Based on these sunshine probability calculation areas and overlapping areas of clouds, as shown in FIG. 8, the sunshine probability with the passage of time can be calculated for each time series.

Figure 2:
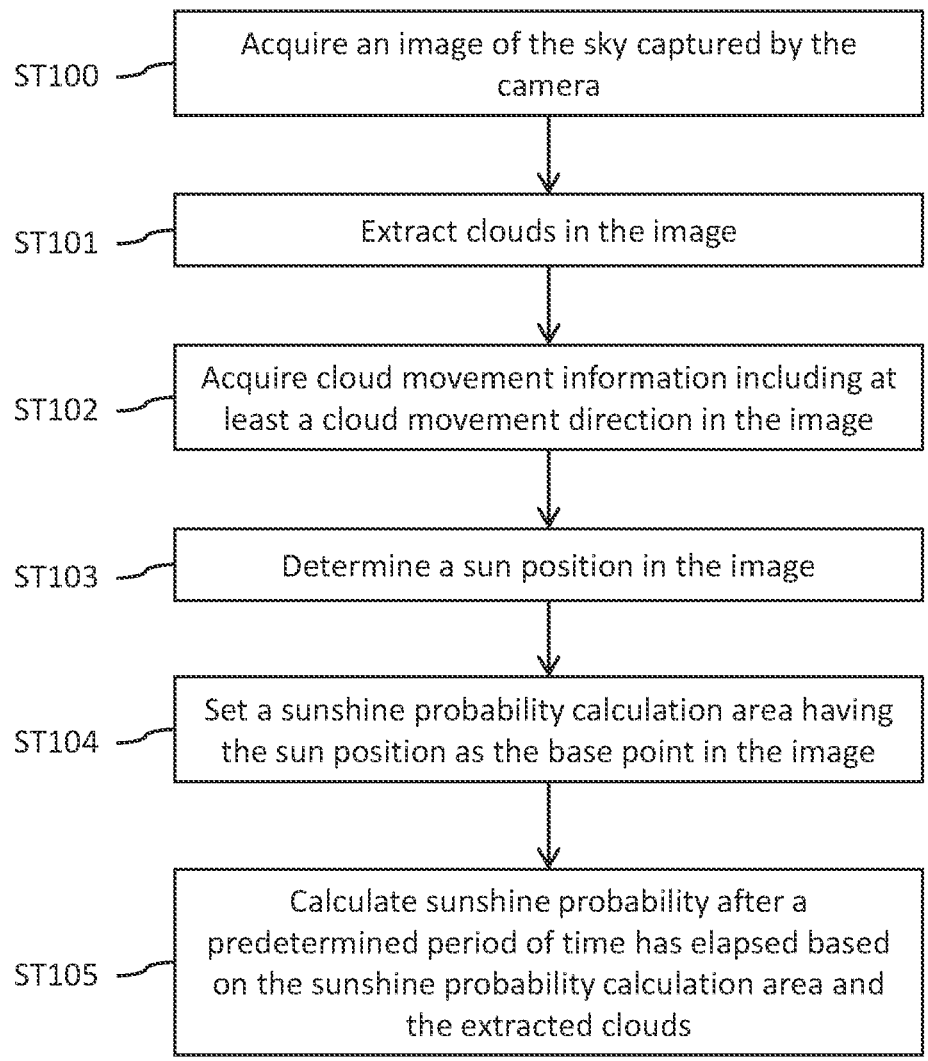
FIG. 2 is a flow chart executed by the cloud observation device according to the first embodiment.

A cloud observation method executed by the cloud observation system 1 will be described with reference to FIG. 2.

First, in step ST100, the image acquisition module 12 acquires the image G1 of the sky captured by the camera 10. In step ST101, the cloud extraction module 13 extracts clouds in the image. In the next step ST102, the cloud movement information acquisition module 15 acquires the cloud movement information including at least the cloud movement direction in the image. In the next step ST103, the sun position determination module 14 determines the sun position S1 in the image. In step ST104, the sunshine probability calculation area setting module sets the sunshine probability calculation area Ar1 having the sun position S1 as a base point in the image. In the next step ST105, the sunshine probability calculation module 17 calculates the sunshine probability after a predetermined period of time has elapsed based on the sunshine probability calculation area Ar1 and the extracted clouds.

Figure 4:
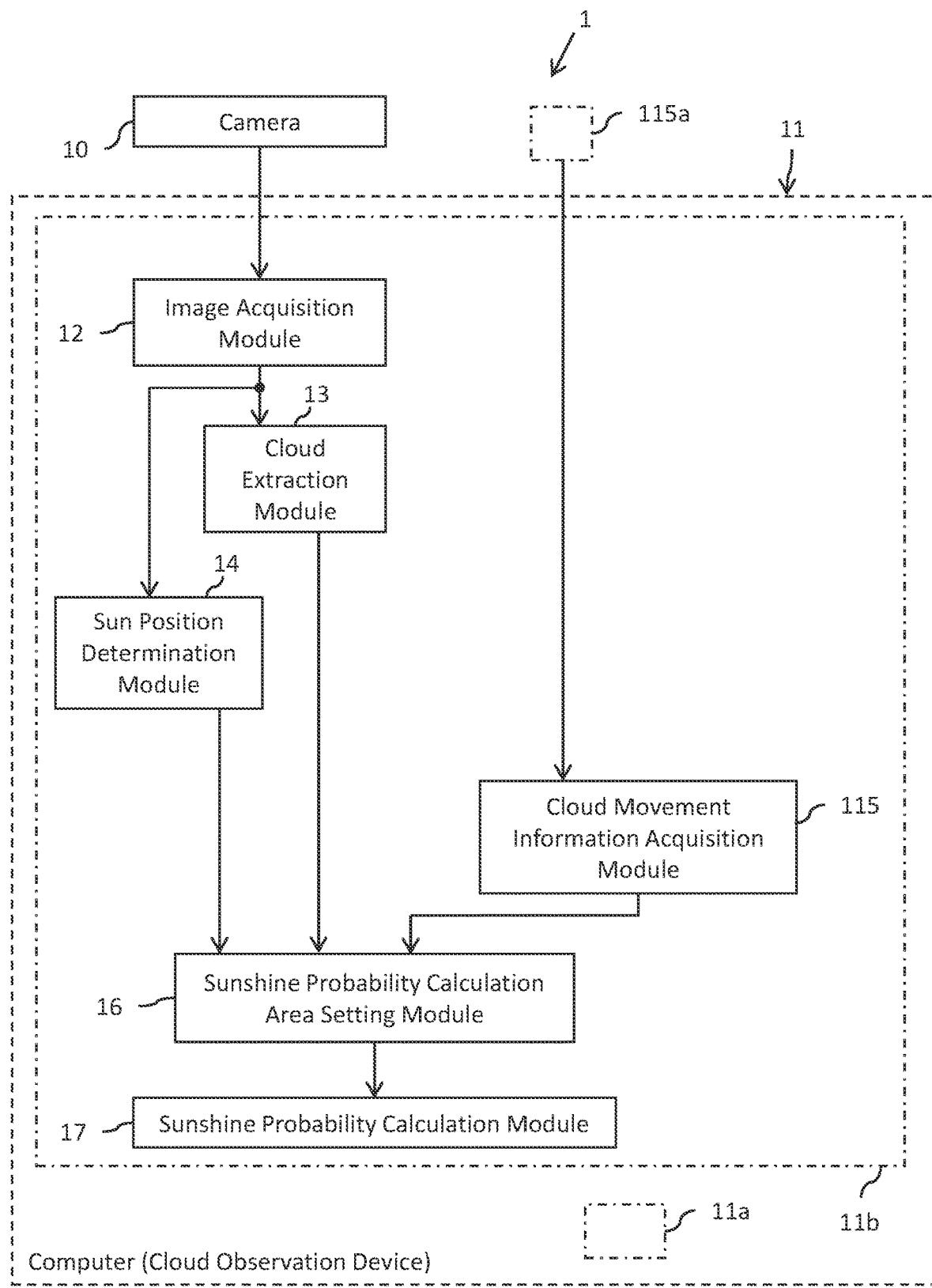
FIG. 4 is a block diagram showing a modification of the first embodiment.

In the embodiment shown in FIG. 1, the cloud movement information is acquired from a plurality of images. For example, as shown in FIG. 4, the cloud movement information acquisition module 115 may be configured to acquire cloud movement information from devices 115a such as an external anemometer and a weather server.

Figure 9:
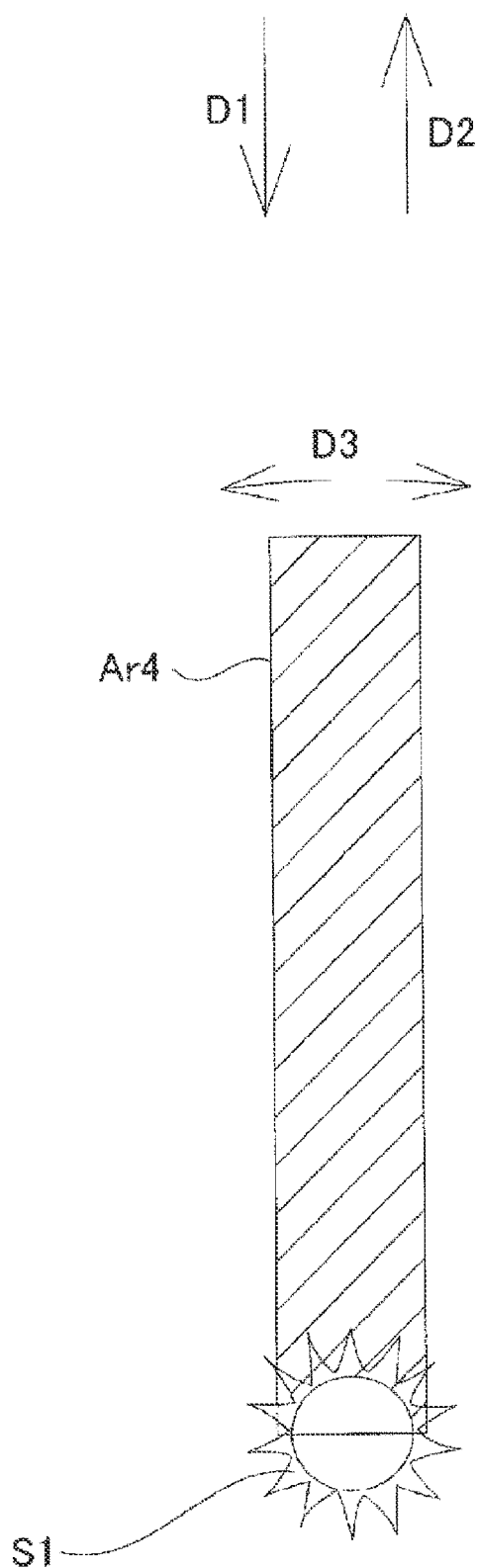
FIG. 9 is a diagram showing a modified example of the sunshine probability calculation area in the first embodiment.
Figure 10:
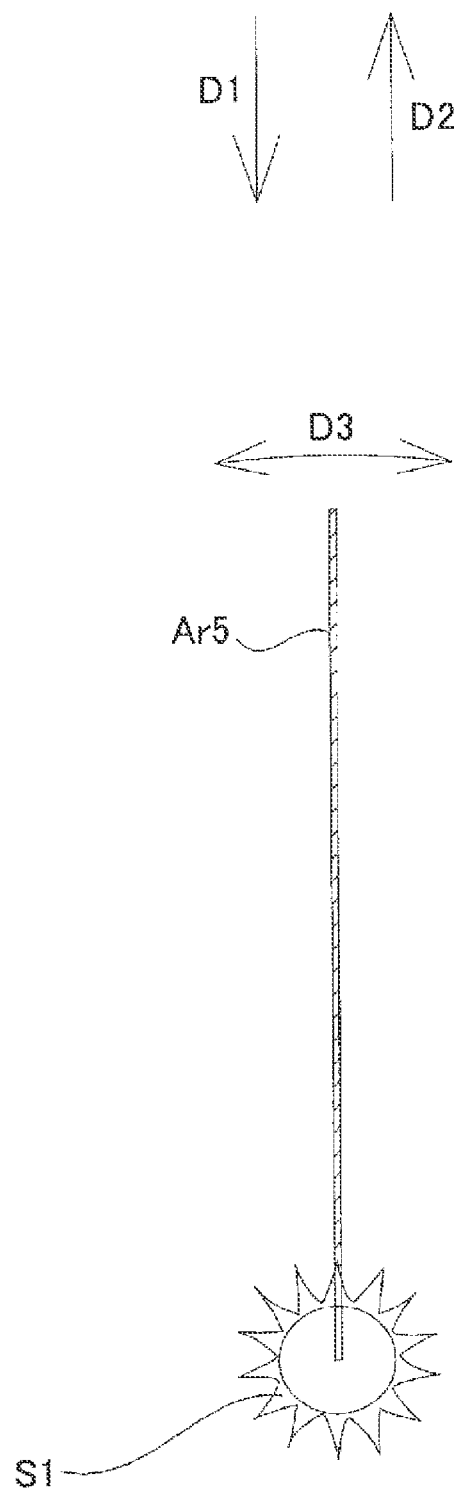
FIG. 10 is a diagram showing a modification example of the sunshine probability calculation area in the first embodiment.
Figure 11:
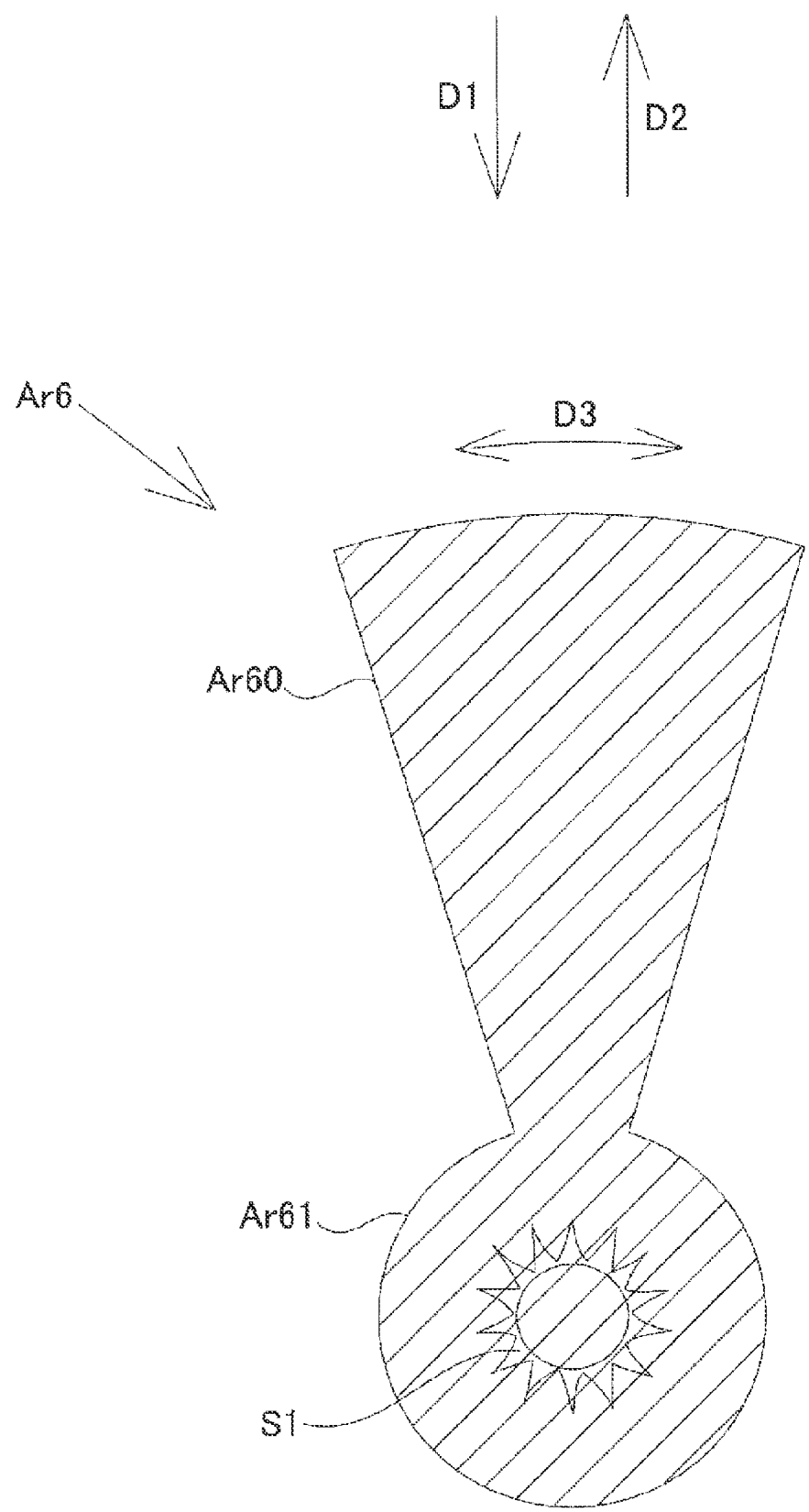
FIG. 11 is a diagram showing a modification example of the sunshine probability calculation area in the first embodiment.
Figure 12:
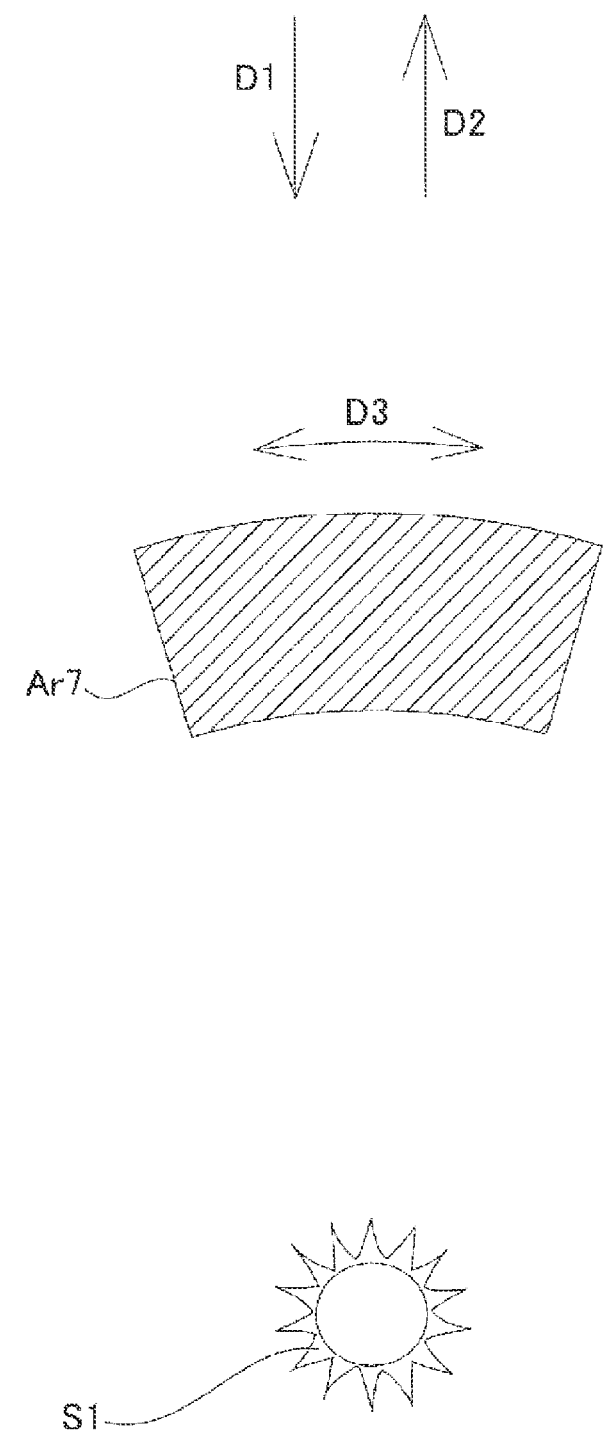
FIG. 12 is a diagram showing a modification example of the sunshine probability calculation area in the first embodiment.
Figure 13:
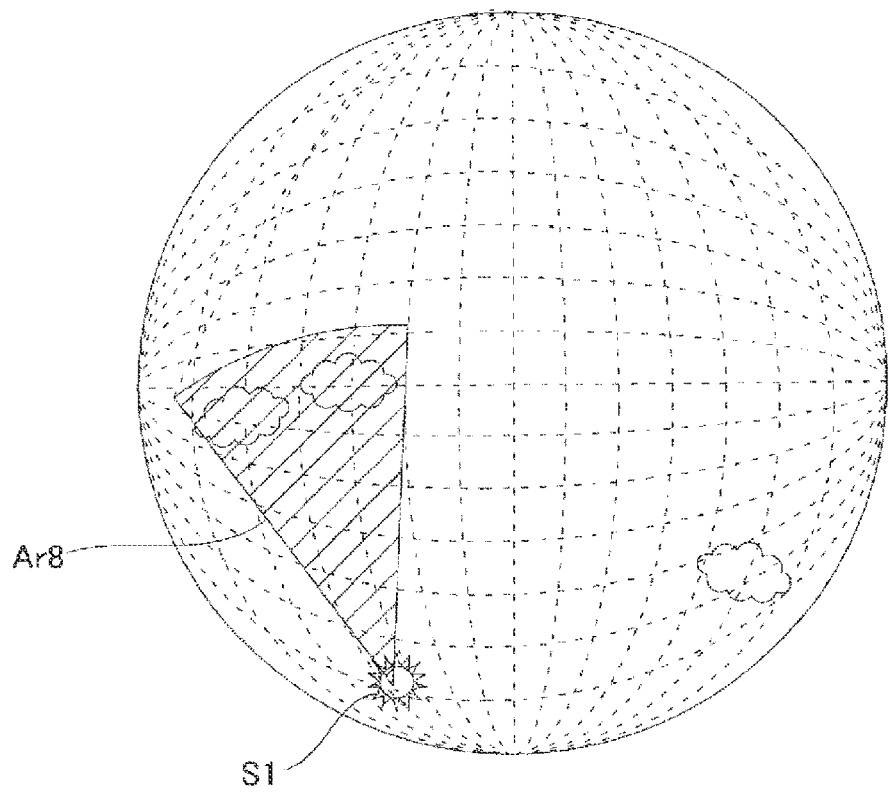
FIG. 13 is a diagram showing a modification example of the sunshine probability calculation area in the first embodiment.
Figure 13:
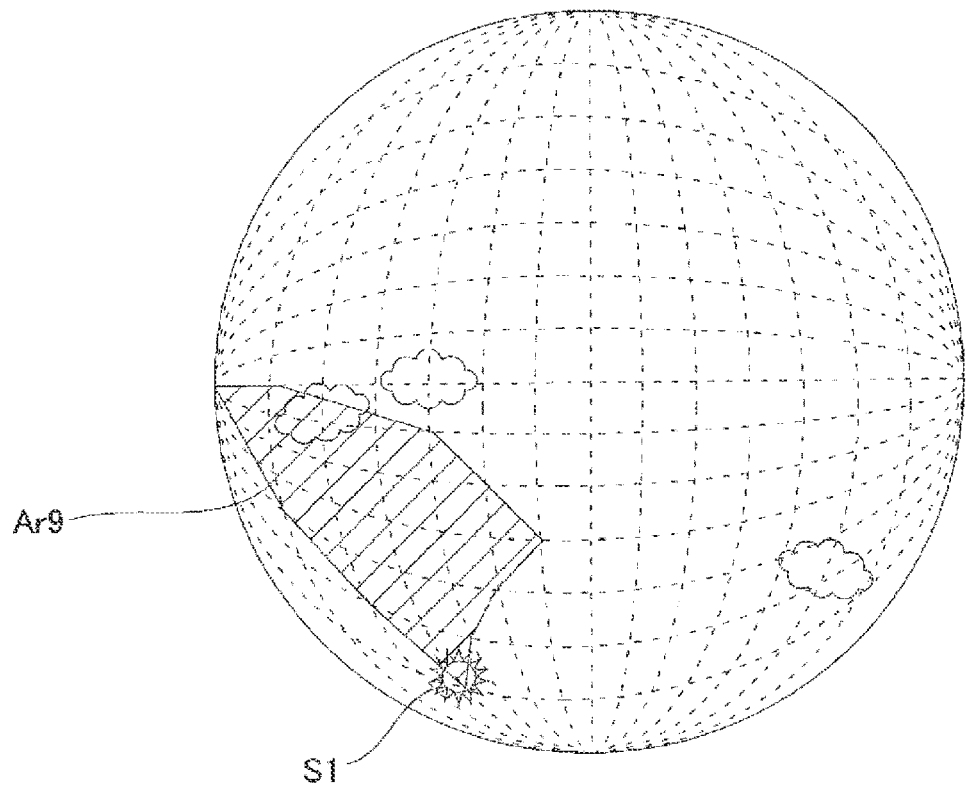

In the embodiment shown in FIG. 8, the sunshine probability calculation area Ar1 has a shape in which the width increases in the direction D2 away from the sun position S1, but the present invention is not limited thereto. For example, as in a sunshine probability calculation area Ar4 shown in FIG. 9, the width may be constant in the direction D2 away from the sun position S1. Further, as in a sunshine probability calculation area Ar5 shown in FIG. 10, there may be a shape having no width in the direction D3 orthogonal to the direction D2 away from the sun position S1. No width means that the pixels constituting the width are one pixel. Further, as in a sunshine probability calculation area Ar6 shown in FIG. 11, there may be provided a region Ar60 extending from the sun position S1 side toward the upstream side of the cloud movement direction D1, and a region Ar61 in the vicinity of the circumference centering on the sun position S1. Further, as in a sunshine probability calculation area Ar7 shown in FIG. 12, it extends from the sun position S1 side toward the upstream side of the cloud movement direction D1, but may be formed so as to avoid the vicinity of the center of the sun position S1. In addition, a sunshine probability calculation area Ar8 shown in FIG. 13 may be formed into a fan-shape without considering the curvature of the fisheye lens, or the sunshine probability calculation area Ar8 may be formed into a shape corrected in consideration of the curvature of the fisheye lens, as shown in FIG. 9.

Figure 14:
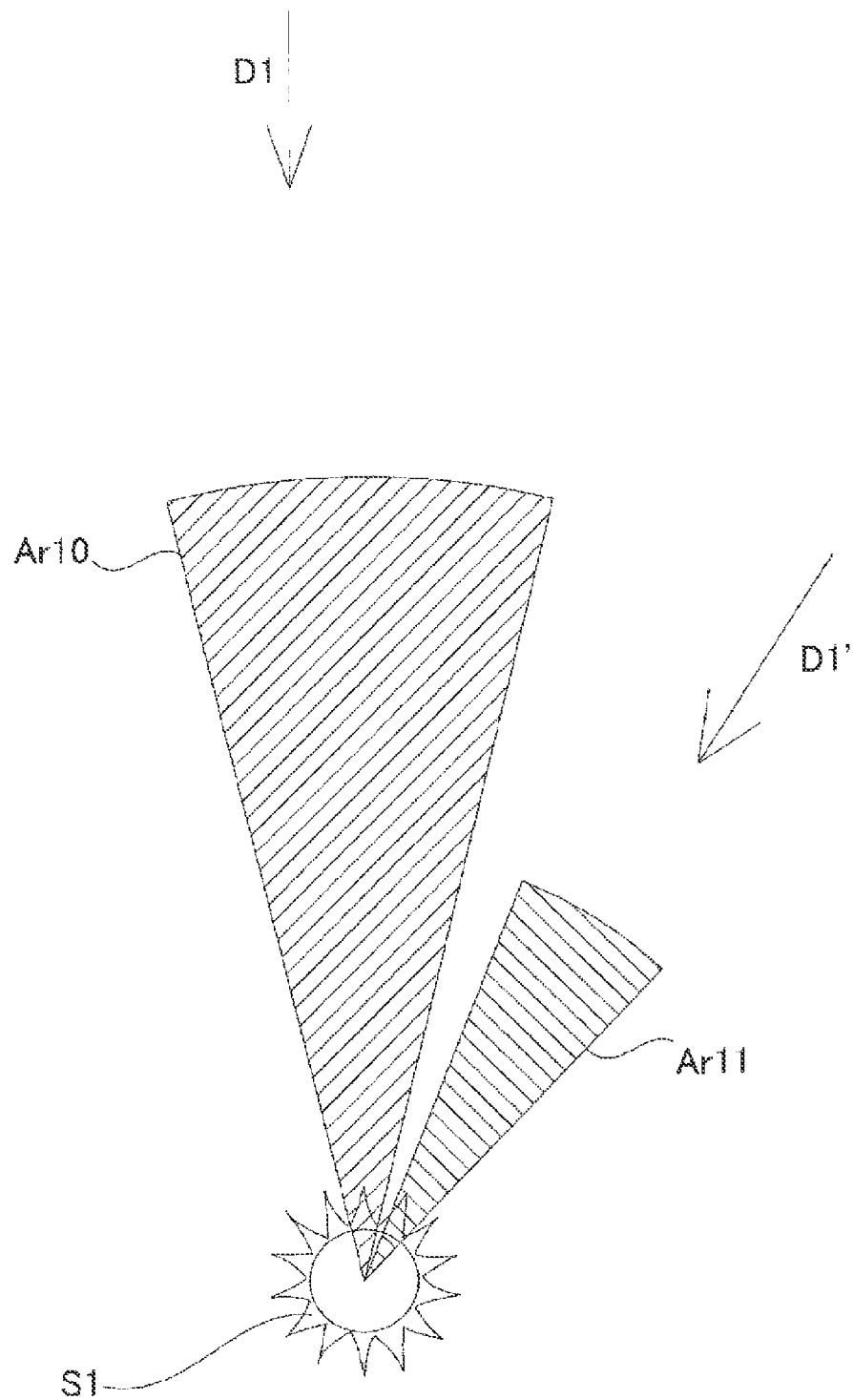
FIG. 14 is a diagram showing a modification example of the sunshine probability calculation area in the first embodiment.

In the above example, it is assumed that all clouds are at the same altitude and that the cloud movement direction and the cloud movement speed are the same, but the present invention is not limited to this. For example, the moving direction and speed of each cloud may differ depending on the altitude of the cloud. In such a case, it is preferable to provide not a single sunshine probability calculation area but a plurality of sunshine probability calculation areas. That is, as shown in FIG. 14, it is preferable that the cloud movement information acquisition module 15 acquires a plurality of cloud movement information (Cloud Movement Direction D1, D1'), the sunshine probability calculation area setting module 16 sets a plurality of sunshine probability calculation areas Ar10 and Ar11 based on the plurality of cloud movement information (Cloud Movement Direction D1, D1'), and the sunshine probability calculation module 17 calculates a sunshine probability for each of the plurality of sunshine probability calculation areas Ar10 and Ar11.

Figure 15:
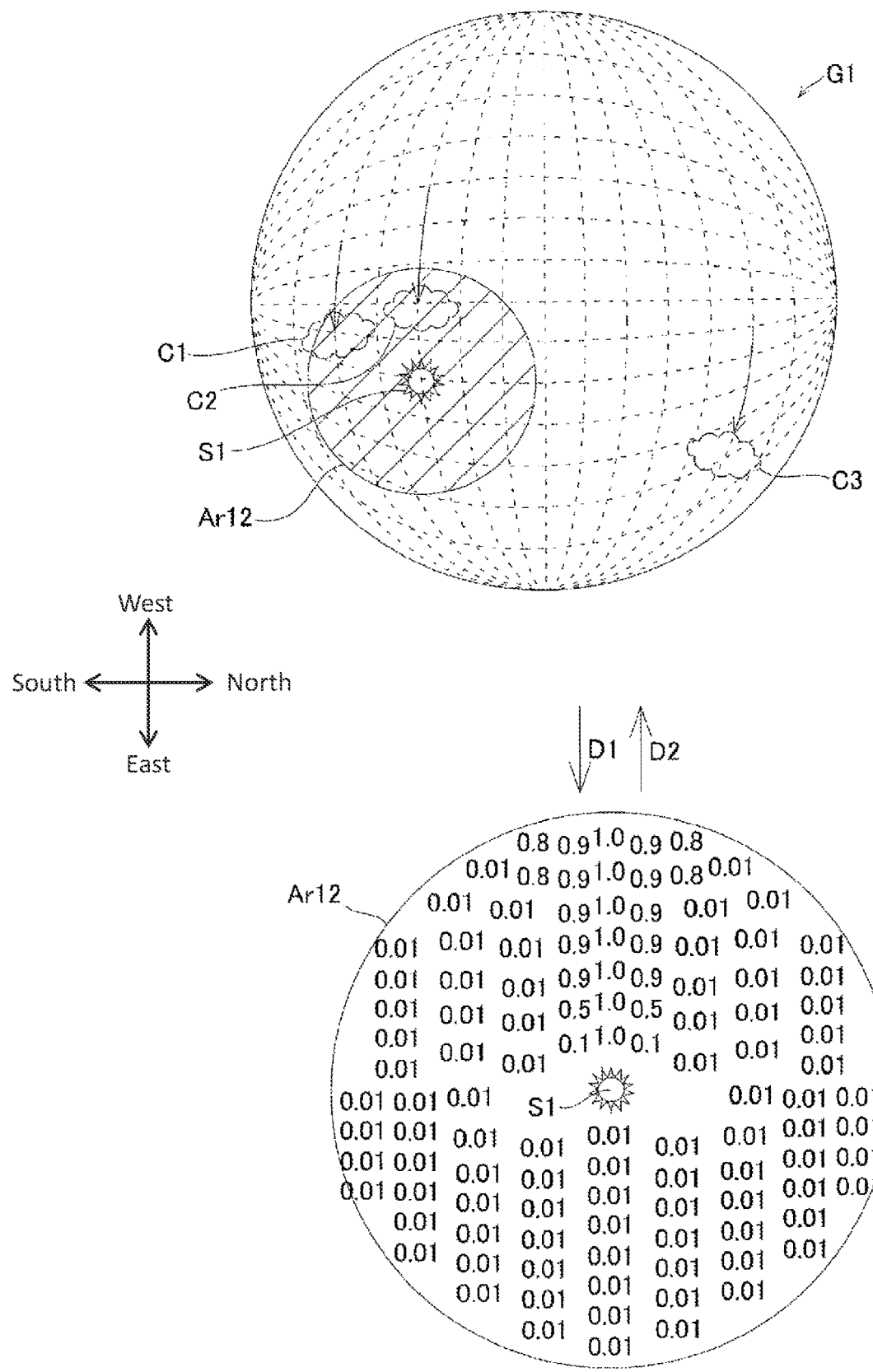
FIG. 15 is a diagram showing a modified example of the sunshine probability calculation area and the sunshine probability calculation method according to the first embodiment.

In the embodiment shown in FIGS. 1-14, the sunshine probability calculation area is set based on the cloud movement direction, and the sunshine probability is calculated based on the presence/absence of overlap between the sunshine probability calculation area and the extracted clouds, but the present invention is not limited to this. For example, as shown in FIG. 15, the sunshine probability calculation area setting module 16 sets a sunshine probability calculation area Ar12 with the sun position S1 as the base point. The sunshine probability calculation area Ar12 shown in FIG. 15 is a circle around the sun position S1, but may have any shape as long as it is based on the sun position S1. As shown in FIG. 15, the sunshine probability calculation module 17 calculates the probability of sunshine after the lapse of a predetermined period of time based on a weighting coefficient, which is set so that the importance of the upstream side D2 of the cloud moving direction D1 is higher than that of the downstream side D1 with the sun position S1 as the base point, the sunshine probability calculation area Ar12, and the extracted clouds. In FIG. 15, the weight coefficients are expressed by numbers, and the larger the weight coefficients, the higher the importance. In the example of FIG. 15, a weight coefficient (1.0-0.9) indicating a high importance is set in a portion corresponding to the fan-shaped sunshine probability calculation area Ar1 shown in FIG. 8, and a weight coefficient (0.01) indicating a low importance is set in a portion other than the fan-shaped sunshine probability calculation area Ar1. According to this configuration, the sunshine probability can be calculated in the same meaning as in the fan-shaped sunshine probability calculation area Ar1 shown in FIG. 8. It should be noted that the setting of the sunshine probability calculation area based on the cloud movement direction shown in FIGS. 1-14 and the use of the weighting factor can be used in combination.

As described above, the cloud observation device 11 according to the present embodiment includes:
    the image acquisition module 12 which acquires an image G1 in which the camera 10 captures the sky;
    the cloud extraction module 13 configured to extract clouds in the image G1;
    the sun position determination module 14 configured to determine the sun position S1 in the image G1;
    the sunshine probability calculation area setting module 16 configured to set the sunshine probability calculation area (Ar1, Ar4-12) having the sun position S1 as a base point in the image G1;
    the sunshine probability calculation module 17 configured to calculate the sunshine probability after a predetermined time has elapsed based on the sunshine probability calculation area and the extracted clouds.

The cloud observation method of the present embodiment includes:
    acquiring the image G1 in which the camera 10 captures the sky (ST100);
    extracting clouds in the image G1 (ST101);
    determining the sun position S1 in the image G1 (ST103);
    In the image G1, the sunshine probability calculation area (Ar1, Ar4-12) with the sun position S1 as a base point is set (ST104);
    setting, in the image G1, the sunshine probability calculation area (Ar1, Ar4-12) having the sun position S1 as the base point (ST104); and
    calculating the sunshine probability after the lapse of a predetermined time based on the sunshine probability calculation area and the extracted clouds (ST105).

In this manner, since the sunshine probability is calculated after a predetermined time has elapsed based on the sunshine probability calculation area (Ar1, Ar4-12) and the extracted clouds set with the sun position S1 as the base point, it is not necessary to predict the position after the predetermined time has elapsed for each cloud, and it is only necessary to determine whether or not clouds exist in the sunshine probability calculation area (Ar1, Ar4-12). However, only by changing the area to be evaluated in the sunshine probability calculation area (Ar1, Ar4-12), the sunshine probability at a plurality of time instances can be easily calculated. Therefore, the sunshine probability can be calculated by reducing the calculation cost and by using the simple method.

As in the embodiment shown in FIGS. 8-14, it is preferable to include the cloud movement information acquisition module (15, 115) configured to acquire cloud movement information including at least the cloud movement direction D1 in the image G1, and the sunshine probability calculation area setting module 16 sets a sunshine probability calculation area (Ar1, Ar4-11) based on the cloud movement direction D1 with the sun position S1 as a base point.

According to this configuration, the sunshine probability calculation area (Ar1, Ar4-11) can be set in consideration of the cloud movement direction D1, and the prediction accuracy of the sunshine probability can be improved.

As in the embodiment shown in FIGS. 8-14, it is preferable that the sunshine probability calculation area setting module 16 sets a sunshine probability calculation area (Ar1, Ar4-11) wider on the upstream side D2 of the cloud movement direction D1 than on the downstream side D1 with the sun position S1 as a base point.

The upstream side D2 is a region where the cloud has a higher possibility of reaching the sun with the passage of time than the downstream side D1 in the cloud movement direction D1 with the sun position S1 as a base point. In this way, it is possible to set a region where the cloud has a high possibility of reaching the sun due to the passage of time in consideration of the cloud movement direction D1, if the cloud exists, and it is possible to improve the prediction accuracy of the sunshine probability.

As in the embodiment shown in FIG. 8, the cloud movement information includes the cloud movement speed, and it is preferable that the length W1 of the sunshine probability calculation area Ar1 in the direction D2 away from the sun position S1 is set in accordance with the cloud movement speed with the sun position S1 as a base point.

In this way, the length W1 can be appropriately set according to the time range and the cloud movement speed from the present to the future in which the sunshine probability is to be predicted.

As in the embodiment shown in FIG. 8, the cloud movement information includes a cloud movement speed, and the sunshine probability calculation module 17 preferably calculates the sunshine probability after a predetermined time has elapsed based on the distance from the extracted clouds to the sun position S1 and the cloud movement speed.

In this way, the sunshine probability can be calculated based on the degree of cloudiness or sunny weather.

As in the embodiment shown in FIG. 8, it is preferable that the sunshine probability calculation module 17 calculates the sunshine probability after a predetermined time has elapsed based on the overlapping area of the sunshine probability calculation area Ar1 (Ar2, Ar3) and the extracted clouds.

In this way, the sunshine probability can be calculated by the ratio of the overlapping area to the sunshine probability calculation area.

As in the embodiment shown in FIGS. 8-14, the sunshine probability calculation area (Ar1, Ar4-11) preferably has a region extending from the sun position S1 side toward the upstream side D2 of the cloud movement direction D1.

According to this configuration, since the upstream side D2 of the cloud movement direction D1 from the sun position S1 side sets a region where the cloud has a high possibility of reaching the sun with the passage of time, it is possible to improve the prediction accuracy of the sunshine probability.

As in the embodiment shown in FIGS. 8-9 and 11-14, the sunshine probability calculation area (Ar1, Ar4, and Ar6-11) preferably has a width equal to or greater than a predetermined value in the direction D3 orthogonal to the direction D2 away from the sun position S1.

The cloud movement direction D1 may change with the passage of time, and since the sunshine probability calculation area (Ar1, Ar4, and Ar6-11) has a width equal to or greater than a predetermined value in this way, it is possible to cope with the possibility that the cloud movement direction D1 may change, and it is possible to improve the prediction accuracy of the sunshine probability.

As in the embodiment shown in FIGS. 8-9 and 11-14, the sunshine probability calculation area (Ar1, Ar4, and Ar6-11) has a shape in which the width extends in the direction D2 away from the sun position S1.

The longer the distance that clouds reach the sun position S1, that is, the farther the clouds are from the sun position S1, the higher the possibility that the cloud movement direction changes, and therefore, by making the sunshine probability calculation area (Ar1, Ar4, and Ar6-11) wider toward the direction D2 away from the sun position S1, the region corresponding to the change probability of the course can be set, and the accuracy of the prediction of the sunshine probability can be improved.

As in the embodiment shown in FIG. 15, it is preferable that the sunshine probability calculation module 17 calculates the sunshine probability after a predetermined period of time has elapsed based on a weighting factor in which the importance of the upstream side D2 of the cloud movement direction D1 is set higher than that of the downstream side D1 with the sun position S1 as the base point, the sunshine probability calculation area Ar12, and the extracted clouds.

In this way, it is possible to set a region where the cloud has a high possibility of reaching the sun due to the passage of time in consideration of the cloud movement direction D1, if the cloud exists, and it is possible to improve the prediction accuracy of the sunshine probability.

As in the embodiment shown in FIGS. 1, 3, and 5-7, it is preferable that the image acquisition module 12 acquires the plurality of images G1 and G2 in which the cameras sequentially photograph the sky, and the cloud movement information acquisition module 15 calculates the cloud movement information in each of the images G1 and G2 based on the plurality of sequentially photographed images G1 and G2.

According to this configuration, the cloud movement information can be acquired only by images.

As in the embodiments shown in FIGS. 1 and 5-7, it is preferable to include the identical cloud identification module 18 configured to identify clouds (C01) from clouds (C01, C02) in the first image G1 corresponding to clouds (C03, C04) in the second image G2 photographed before the first image G1, and the cloud movement information acquisition module 15 calculates the cloud movement information based on the positions of clouds (C01) in the first image G1 and the positions of corresponding clouds (C03, C04) in the second image G2.

According to this configuration, since the corresponding clouds are identified from the first image G1 and the second image G2, the cloud movement information can be appropriately calculated.

As in the embodiments shown in FIGS. 1 and 5-7, it is preferable to include the grouping setting module 18a configured to set the plurality of groups (P1 to P7) in which clouds (C01, C02) in the first image G1 and clouds (C03-06) in the second image G2 are combined in a one-to-one, one-to-many, or many-to-one relationship;

the group removal module 18b configured to delete a group on the basis of at least one of a moving distance between clouds, a size change amount, a luminance change amount, a saturation change amount, and a hue change amount so that one group is set for one cloud; and the identification module 18c configured to identify that the clouds in the first image G1 and the corresponding clouds in the second image G2 are the identical clouds based on the remaining group.

According to this configuration, even if clouds combine or separate as time passes, they can be recognized as the identical cloud.

As in the embodiment shown in FIGS. 1 and 3, the cloud movement information is preferably calculated by averaging at least the cloud movement direction of each cloud in the image G1 (G2).

With this configuration, it is possible to reduce errors caused by focusing only on individual clouds.

As in the embodiment shown in FIGS. 1 and 3, the cloud movement information is preferably calculated by a moving average over a plurality of images G1 and G2.

According to this configuration, even if an abnormal value is mixed in, the influence thereof can be suppressed.

As in the embodiment shown in FIG. 14, it is preferable that the cloud movement information acquisition module 15 acquires the plurality of cloud movement information, the sunshine probability calculation area setting module 16 sets the plurality of sunshine probability calculation areas Ar10 and Ar11 based on the plurality of cloud movement information, and the sunshine probability calculation module 17 calculates the sunshine probability for each of the plurality of sunshine probability calculation areas Ar10 and Ar11.

According to this configuration, the moving direction and the speed may be different for each cloud depending on the altitude of the cloud, and the probability of sunshine can be calculated independently for clouds having different cloud movement information.

The cloud observation system 1 according to the present embodiment includes the camera 10 and the cloud observation device 11.

The program according to the present embodiment is a program for causing a computer (cloud observation device) 11 to execute the method. The computer readable temporary recording medium according to the present embodiment stores the program.

Although the embodiments of the present disclosure have been described above with reference to the drawings, it should be understood that the specific configuration is not limited to these embodiments. The scope of the present disclosure is set forth not only by the description of the embodiments described above, but also by the claims, and further includes all modifications within the meaning and scope of the claims.

For example, the order of execution of each process, such as operations, procedures, steps, and steps, in the devices, systems, programs, and methods illustrated in the claims, the description, and the drawings may be implemented in any order, unless the output of the previous process is used in a subsequent process. Even if the flow in the claims, the description, and the drawings is explained by using "First of all,", "Next", etc., it does not mean that it is essential to carry out in this order.

Figure 16:
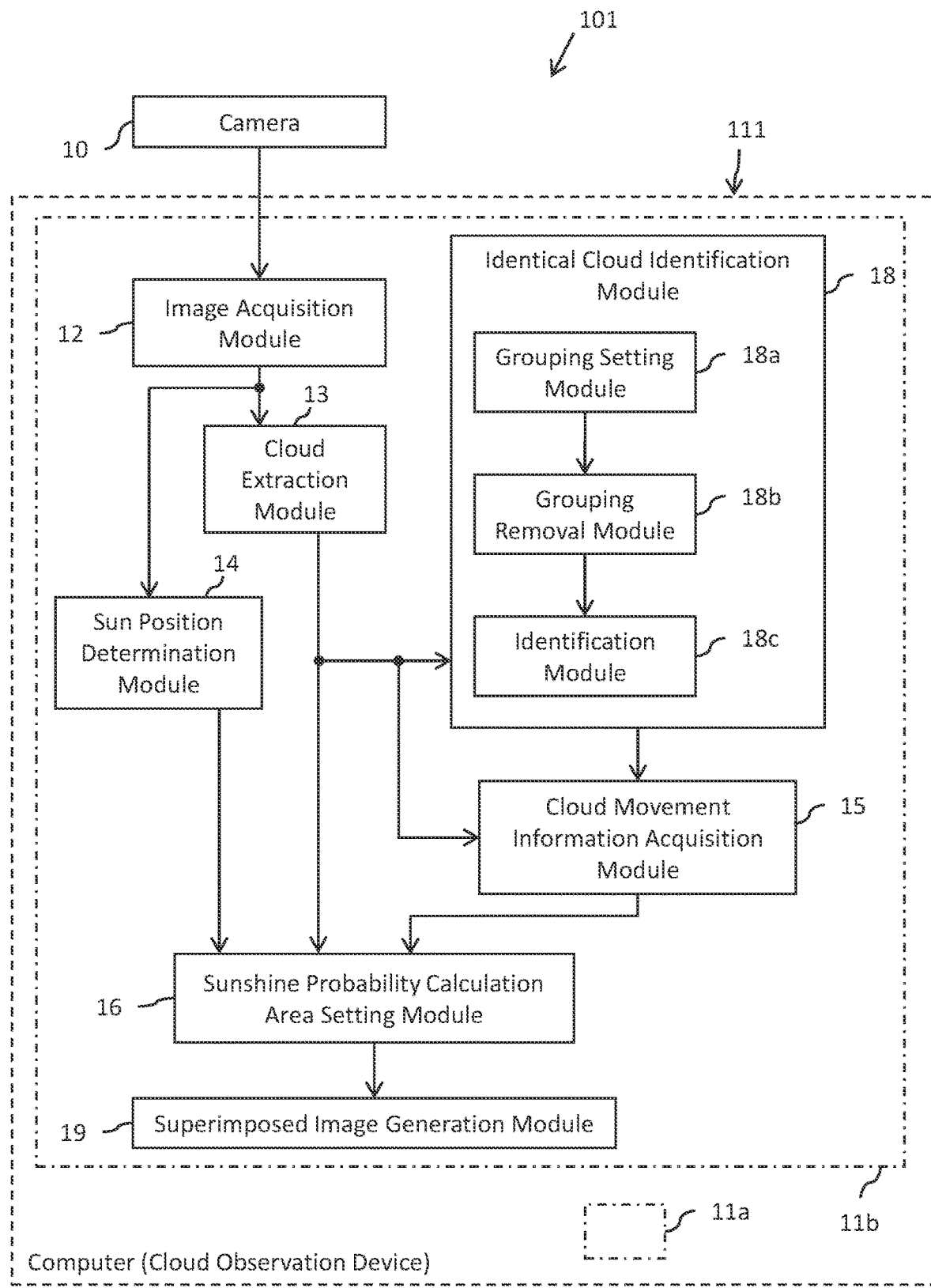
FIG. 16 is a block diagram showing the configuration of a cloud observation system according to a second embodiment.

A cloud observation system 101, a cloud observation device 111, and a cloud observation method according to a second embodiment of the present disclosure will be described. The same components as those of the first embodiment are denoted by the same reference numerals and description thereof will be omitted. As shown in FIG. 16, the cloud observation device 111 of the second embodiment does not include the sunshine probability calculation module 17, but instead includes a superimposed image generation module 19. As shown in FIG. 8, the superimposed image generation module 19 generates an image in which the sunshine probability calculation area Ar1 is superimposed on the image G1 (G2). The generated image is displayed on a display provided in the cloud observation device 11 or transmitted to an external computer and finally displayed on the display.

According to this configuration, since clouds (C1, C2), the sun position S1, and the sunshine probability calculation area Ar1 are drawn in the superimposed image, the sunshine probability after a predetermined time has elapsed can be known only by viewing the superimposed image.

Each module 12-17 shown in FIG. 1 is implemented by executing a predetermined program by one or multiple processor(s), but each module may be constituted by a dedicated memory or a dedicated circuit.

In the cloud observation system 1 or 101 of the present embodiment, the respective modules 12-17 are mounted on the processor 11b of one computer (cloud observation device) 11, but the respective modules 12-17 may be distributed and mounted on a plurality of computers or clouds. That is, it may be executed by a plurality of processors.

The structures employed in the above embodiments may be employed in any other embodiment. In FIG. 1, each module 12-17 is mounted for convenience of explanation, but a part of them can be omitted optionally. For example, there is an embodiment in which each module 12-14 is mounted.

The specific configuration of each module is not limited to the above-described embodiment, and various modifications can be made without departing from the scope of the present disclosure.

LIST OF REFERENCE CHARACTERS 11,111 Cloud Observation Device
12 Image Acquisition Module
13 Cloud Extraction Module
14 Sun Position Determination Module
15, 115 Cloud Movement Information Acquisition Module
16 Sunshine Probability Calculation Area Setting Module
17 Sunshine Probability Calculation Module
18 Identical Cloud Identification Module
18a Grouping Setting Module
18b Grouping Removal Module
18c Identification Module
19 Superimposed Image Generation Module
G1 Image (First Image)
G2 Image (Second Image)

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, movable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A cloud observation device, comprising:
processing circuitry configured
to acquire an image of the sky captured by a camera;
to extract clouds in the image;
to determine a sun position in the image;
to acquire cloud movement information including at least a cloud movement direction in the image; and
to set a sunshine probability calculation area having the sun position as a base point in the image, wherein:
the processing circuitry sets the sunshine probability calculation area based on the cloud movement direction with the sun position as the base point; and
the processing circuitry sets the sunshine probability calculation area wider on an upstream side than on a downstream side in the cloud movement direction with the sun position as the base point; and to calculate a sunshine probability after a predetermined period of time has elapsed based on the sunshine probability calculation area and the extracted clouds.

2. The cloud observation device according to claim 1, wherein:
   the cloud movement information includes a cloud movement speed; and
   a length of the sunshine probability calculation area in a direction away from the sun position is set in accordance with the cloud movement speed with the sun position as the base point.

3. The cloud observation device according to claim 1, wherein:
   the cloud movement information includes a cloud movement speed; and
   the processing circuitry calculates the sunshine probability after the predetermined time has elapsed based on a distance from the extracted clouds to the sun position and the cloud movement speed.

4. The cloud observation device according to claim 1, wherein:
   the processing circuitry calculates the sunshine probability after the predetermined time has elapsed based on an overlapping area of the sunshine probability calculation area and the extracted clouds.

5. The cloud observation device according to claim 1, wherein:
   the sunshine probability calculation area has a region extending from the sun position side towards the upstream side in the cloud movement direction.

6. The cloud observation device according to claim 1, wherein:
   the sunshine probability calculation area has a width equal to or greater than a predetermined value in a direction orthogonal to a direction away from the sun position.

7. The cloud observation device according to claim 1, wherein:
   the sunshine probability calculation area has a shape in which the width extends in a direction away from the sun position.

8. The cloud observation device according to claim 1, wherein the processing circuitry is further configured:
   to acquire the cloud movement information including at least the cloud movement direction in the image; and
   to calculate the sunshine probability after the lapse of the predetermined time based on a weight coefficient set to be more important on the upstream side in the cloud movement direction than on the downstream side with the sun position as the base point, the sunshine probability calculation area and the extracted clouds.

9. The cloud observation device according to claim 1, wherein the processing circuitry is further configured:
   to acquire a plurality of images obtained by sequentially photographing the sky by the camera; and
   to calculate the cloud movement information in each image based on the plurality of sequentially photographed images.

10. The cloud observation device according to claim 9, wherein the processing circuitry is further configured:
    to identify clouds corresponding to clouds in a second image photographed before a first image from among clouds in the first image; and
    to calculate the cloud movement information based on a cloud position in the first image and a corresponding cloud position in the second image.

11. The cloud observation device according to claim 10, wherein the processing circuitry is further configured:
    to set a plurality of groups in which clouds in the first image and clouds in the second image are combined in a one-to-one, one-to-many, or many-to-one relationship;
    to delete a group of the plurality of groups on the basis of at least one of a moving distance between clouds, a size change amount, a luminance change amount, a saturation change amount, and a hue change amount so that one group is set for one cloud; and
    to identify clouds in the first image and corresponding clouds in the second image as the identical cloud based on the remaining group.

12. The cloud observation device according to claim 9, wherein:
    the cloud movement information is calculated by averaging at least the cloud movement direction of each cloud in the image.

13. The cloud observation device according to claim 12, wherein:
    the cloud movement information is calculated by a moving average over a plurality of images.

14. The cloud observation device according to claim 1, wherein the processing circuitry is further configured:
    to acquire a plurality of cloud movement information;
    to set a plurality of sunshine probability calculation areas on the basis of the plurality of cloud movement information; and
    to calculate a sunshine probability for each of the plurality of sunshine probability calculation areas.

15. A cloud observation method comprising:
    acquiring an image of the sky captured by a camera;
    extracting clouds in the image;
    determining a sun position in the image;
    acquiring cloud movement information including at least a cloud movement direction in the image;
    setting, in the image, a sunshine probability calculation area having the sun position as a base point, wherein:
       the sunshine probability calculation area is set based on the cloud movement direction with the sun position as the base point; and
       the sunshine probability calculation area is set to be wider on an upstream side than on a downstream side in the cloud movement direction with the sun position as the base point; and
    calculating a sunshine probability after the lapse of a predetermined time based on the sunshine probability calculation area and the extracted clouds.

16. The cloud observation device according to claim 1, wherein the processing circuitry is further configured:
    to generate a superimposed image in which the sunshine probability calculation area is superimposed on the image.

17. The cloud observation method according to claim 15, further comprising:
    generating a superimposed image obtained by superimposing the sunshine probability calculation area on the image.

18. A non-transitory computer-readable recording medium storing a program causing processing at a processor of a cloud observation device, the processing comprising:
    acquiring an image of the sky captured by a camera;
    extracting clouds in the image;
    determining a sun position in the image;
    acquiring cloud movement information including at least a cloud movement direction in the image; and setting, in the image, a sunshine probability calculation area having the sun position as a base point, wherein:
  the sunshine probability calculation area is set based on the cloud movement direction with the sun position as the base point; and
  the sunshine probability calculation area is set to be wider on an upstream side than on a downstream side in the cloud movement direction with the sun position as the base point; and
calculating a sunshine probability after the lapse of a predetermined time based on the sunshine probability calculation area and the extracted clouds.

\* \* \* \* \*